US005500866A

United States Patent [19]
Goethals

[11] Patent Number: 5,500,866
[45] Date of Patent: Mar. 19, 1996

[54] LASER RESONATOR BALANCING

[75] Inventor: Walther A. E. Goethals, Rugby, United Kingdom

[73] Assignee: Lumonics Ltd., United Kingdom

[21] Appl. No.: 221,081

[22] Filed: Mar. 31, 1994

[51] Int. Cl.⁶ ........................................... H01S 3/13
[52] U.S. Cl. .................... 372/32; 372/29; 372/92; 372/72
[58] Field of Search ................. 372/29, 32, 60, 372/70, 75, 72

[56] References Cited

U.S. PATENT DOCUMENTS

| | | | |
|---|---|---|---|
| 4,577,320 | 3/1986 | Yoshikawa et al. | 372/29 |
| 4,910,746 | 3/1990 | Nicholson | 372/72 |
| 5,119,391 | 6/1992 | Maeda et al. | 372/32 |
| 5,272,713 | 12/1993 | Sobby et al. | 372/69 |

OTHER PUBLICATIONS

Koechner; "Optical Resonator"; Solid–State Laser Engineering; 3rd Edition; 1992, pp. 189–225. Date not available to examiner.
Burrows; Yag Laser Resonator Technology; "The Physics and Technology of Laser Resonators"; 1989, pp. 154–162. Date not available to examiner.
Driedger et al.; "Multirod Resonators for High–Power Solid–State Lasers with Improved Beam Quality"; IEEE Journal of Quantum Electronics, vol. 24, No. 4, Apr. 1988; pp. 665–674.
Eggleston; "Periodic Resonators for Average–Power Scaling of Stable-Resonator Solid–State Lasers"; IEEE Journal of Quantum Electronics, vol. 24, No. 9, Sep. 1988; pp. 1821–1824.
Yamada et al.; "Multikilowatt Continuously Pumped ND: Yag Laser"; Conference on Lasers & Electro–Optics, 1988; Paper WL4, 1988 Technical Digest Series, vol. 7, by Opticam Society of America. Date not available to examiner.
ND:Yag Laser System Lay–656, Toshiba Corporation. Date not available to exm.
"Characteristics of Continuously–Pumped High–Power ND: Yag Laser"; CW1.8 KW ND:Yag Laser YL117–6C. Date not available to examiner.
Festokorperlaser zur Materialbearbeitung by R. Ifflander, Springer–Verlag; pp. 82–83. Date not available to examiner.
Kumkar et al.; "Beam Quality and Efficiency of High–Average–Power Multirod Lasers"; Optics & Laser Technology, vol. 24, No. 2, 1992, pp. 67–72. Date not available to exm.
Goller et al; "2 KW–CW–Laser, Presentation of the Results of an Eureka Project"; Laser und Optoelektronik, 25(2), 1993; pp.42–46. Date not available to examiner.
Beam Quality & Efficiency of High–Average–Power Multirod Lasers by M. Kumkar, B. Wedel, K. Richter, Optics & Laser Technology '92, vol. 24, No. 2, p. 67 (no month).

Primary Examiner—Leon Scott, Jr.
Attorney, Agent, or Firm—Nixon & Vanderhye

[57] ABSTRACT

A method and apparatus for optimising the output of a multi-element laser, typically a multi-rod laser is disclosed, the method comprising obtaining a graph of power output against power input for the resonator, selecting an instability point where the output dips, measuring the power output at that point, selectively altering the gains of each of the power supply means supplying each of the laser elements, and selecting an optimum combination of gain values to provide maximum output power at that point.

21 Claims, 6 Drawing Sheets

LASER RESONATOR BALANCING

BACKGROUND OF THE INVENTION

This invention relates to laser resonators and in particular it relates to the balancing of laser resonators for maximum efficiency. The invention relates specifically to a multi-element laser such as a multi-rod laser.

A multi-rod laser is described in commonly-assigned pending U.S. application Ser. No. 08/082,769 which is incorporated herein by reference. The laser is briefly described below for illustrative purposes only. The invention is also applicable to other laser systems.

Figure 1:
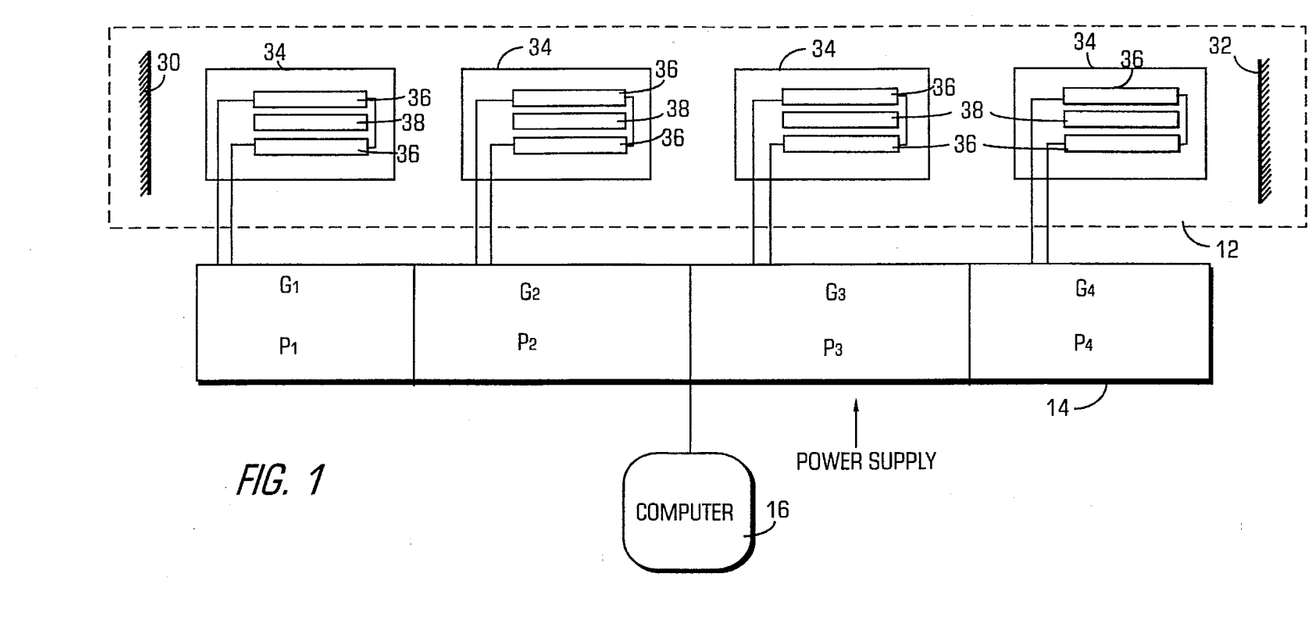
FIG. 1 shows schematically a multi-rod laser system.

Referring now to FIG. 1, a laser system comprises an optical head 12 and a power supply 14 controlled by a computer 16. The optical head 12 has a pair of mirrors 30, 32 which together define an optical resonator. Inside this optical resonator, there are four identical pumping sections or chambers 34.

Each pumping section 34 comprises a pair of discharge lamps 36 which provide pumping light to a laser element 38 (in this case, a solid state laser element). In each pumping chamber 34 the two lamps 36 and the laser element 38 are surrounded by a reflector. The laser element 38 is also surrounded by a water jacket. In operation, filtered, deionized cooling water passes through the water jacket.

The laser element 38 is a solid rod of active laser medium in the form of YAG doped with neodymium. Each laser rod has concave, anti-reflection coated end faces. As is well known, Nd:YAG emits light at a wavelength of 1064 nm. Nd:YAG represents only one example of active laser media which may be used with the present invention. The active laser medium may emit light either inside or outside the visible spectrum. The invention is also applicable to the operation of Nd:YAG at wavelengths other than 1064 nm.

Figure 2:
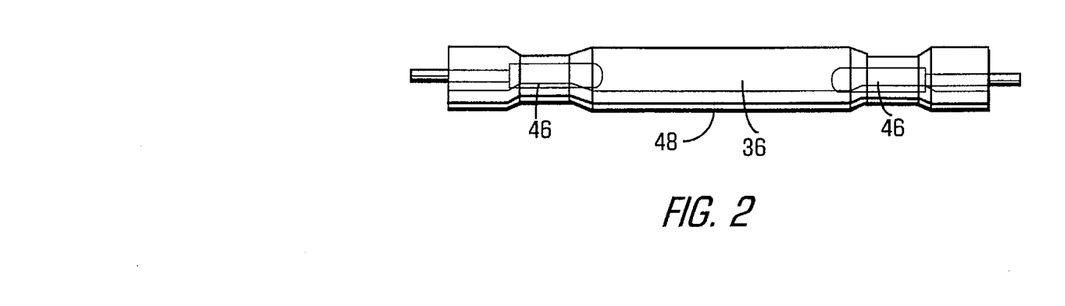
FIG. 2 shows one of the discharge lamps for the system.

As shown in FIG. 2 each lamp 36 comprises a pair of electrodes 46 sealed inside a quartz envelope or tube 48. In order to support a discharge between the electrodes 46, the quartz tube 48 contains krypton gas. The lamps 36 are energized by a power source.

The mirrors 30, 32 provide positive feedback and are plane parallel mirrors formed from coated quartz. On its side facing towards the middle of the optical resonator, the mirror 30 has a reflectivity in excess of 99%. The mirror 32 is the output mirror of the optical head 12 and, on its side facing the middle of the optical resonator, it has a coating that is partially reflective at the laser wavelength.

In each pumping chamber 34, one electrode 46 of one lamp is connected to one electrode 46 of the other lamp 36 so that the lamps 36 are connected in series. The power supply 14 is connected to the other electrode 46 of each lamp 36. Thus, the power supply 14 supplies current to the two electrodes 46 of each lamp 36. The pumping chambers are equally spaced. Furthermore, the laser mirrors are positioned so that the resonator is 'symmetric'.

In general terms, laser oscillation in the system shown in FIG. 1 occurs by virtue of the laser elements 38 providing an active laser (ie gain) medium and the mirrors 30 and 32 providing positive feedback. Oscillation between the two mirrors occurs in one or more stable modes. These are described in "Solid-state laser engineering", Walter Koechner, page 189 et seq, Springer-Verlag, 1992. In particular, this reference describes how a laser resonator can be either stable or unstable. The stability of the resonator is determined by the optical properties (e.g. focal length) of the resonator mirrors and of the laser medium inside the resonator. Occasionally, unstable resonators are used to obtain good laser beam quality but these are difficult to control and very sensitive to changes. Usually, it is required to obtain a stable resonator. It should be noted that the optical characteristics of laser media tend to change with input power and thus the stability may also change when power is changed.

It is common to describe the stability of a resonator in terms of parameters g1 and g2 as described on page 200 of this reference. The so-called g parameters are determined by the focal lengths of, and the distances between the optical components inside the resonator. It is found that some combinations of g1 and g2 result in stability whilst others do not. This is usually illustrated graphically by drawing the g-plane which has stable and unstable regions. A resonator with fixed g parameters is represented by a point in this plane. When the optical characteristics of the resonator are subject to change, the point moves along a trajectory through the plane and may move in and out of stability regions.

It is often required to use resonators with more than one laser medium region inside the resonator, to increase power. The laser rods used in such lasers are very prone to thermal lensing effects caused by heat input from the discharge lamps, which means that their focal length changes dramatically with lamp input power (and so too with laser output power). This leads to very pronounced movements of the stability point in the g-parameter plane. This effect is described more fully in "Multi rod resonators for high-power solid-state lasers with improved beam quality", K. P. Driedger et al, IEEE Journal of Quantum Electronics, Vol. 24. No. 4, April 1988, pages 665 to 674.

The most practical multi-rod arrangement is the so-called symmetric (or periodic) resonator. This tries to minimise the extent of incursions into instability regions by imposing periodic symmetry onto the resonator. In the symmetric resonator, if the center-line spacing of the pumping chambers is 2L, then the plane mirrors are positioned a distance L from the respective center-line of the adjacent pumping chambers. Moreover, for perfect symmetry, the focal length of the laser rods must be identical at all times. It is, however, generally acknowledged that a perfectly symmetric resonator is impossible to obtain since the thermal and optical characteristics of all the rods in a multi-rod laser system cannot be perfectly matched in all aspects. Therefore, unstable operating regions still occur and have up to now been tolerated. In these regions, beam characteristics deteriorate dramatically, thus degrading the usefulness of such laser systems.

Figure 3:
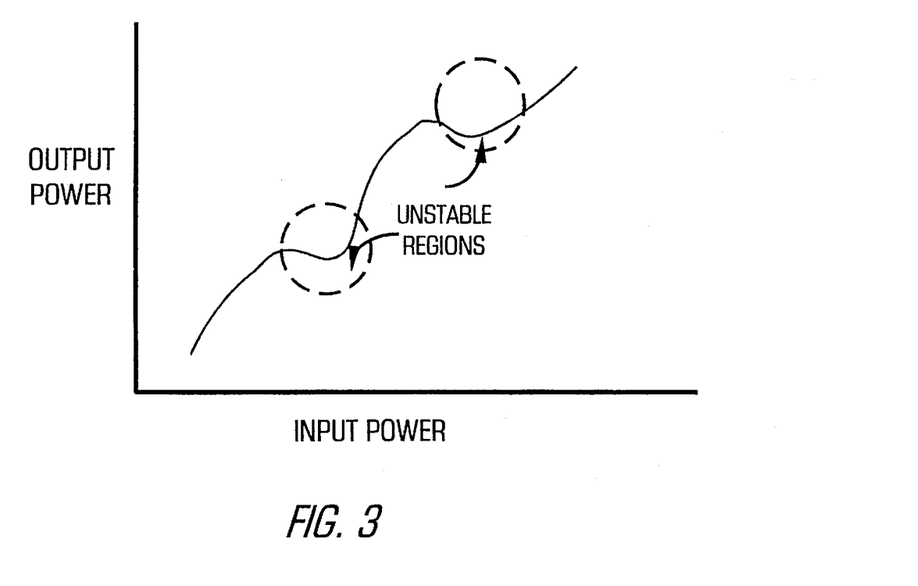
FIG. 3 shows schematically a graph of output power versus input power.

Unstable regions in laser resonators principally reveal themselves as dips in a graph when laser output power is plotted as a function of input power to the discharge lamps. A schematic example of this is shown in FIG. 3 which illustrates how, as the input power to the lamps increases, the output power generally increases apart from at unstable regions where dips in the output power occurs. There may be only one dip or a plurality of dips may occur. This effect is well documented.

Up to now, attempts to overcome these instabilities have involved careful design, and matching of the various laser elements. Resonators have been used which are as near symmetric as possible; in particular laser rods have been spaced as carefully as possible. Other than that, it has been accepted that little can be done other than by trying to select laser rods with similar characteristics.

In 1992, M Kumkar et al conceded in Optics & Laser Technology Vol 24 No 2 1992, pages 67 to 72, that different refractive powers of individual laser rods cannot be avoided. Also, in 1993, Goeller et al reported results for a state-of-the-art project in Laser und Optoelektronik Vol 25 No 2, 1993, pages 42 to 46, that exhibited power dips without any proposals for solutions to the problem.

It is an object of the present invention to attempt to improve laser resonators by reducing or eliminating the presence of unstable regions in the power output curve.

It is further an object of the present invention to provide a method for reducing instabilities in output power of a multi-element laser.

Other and further objects, advantages and features of the invention will become apparent.

SUMMARY OF THE INVENTION

It has been realised by the inventor that in a multi-element, e.g. multi-rod, laser resonator, each element is pumped by its own lamps and power supply. The focal length of the rod depends on the characteristics of the rod, the pumping chamber, the lamps and the power supply. When the individual power supplies are controlled by the same power demand signal, it is therefore most likely that the focal lengths of each of the rods will ultimately differ, thus resulting in a resonator having unstable operating regions.

Whereas previously, attempts to improve the power curve have involved altering the hardware of the system as described above; according to the present invention, the hardware itself is not altered but instead the focal lengths of the individual laser elements (which are preferably laser rods but which may be other elements) are equalised by adjusting the gains of the power demand signals input to the power supplies for each of the rods. Thus, in a controlled system, the power demand signal is split into an individual signal, having adjustable gain, for each individual element. Thereby, the power demand for each power supply can be individually adjusted and the focal lengths of each element can be made the same by adjusting the gains, thereby reducing instabilities and so stabilising or "balancing" the resonator.

According to the present invention, there is provided a method of reducing instabilities in a multi-element laser resonator, comprising selecting an instability point, measuring the output power of the laser resonator at that instability point, selectively altering the gains of the power supply to each respective laser element and finding an optimum combination of gain values to provide maximum output power at that point.

Embodiments of the invention will now be described, by way of example only, with reference to the accompanying drawings, in which;

DETAILED DESCRIPTION

As shown in FIG. 1, the power supply to each of the laser elements 34 is independent. Supplies P1, P2, P3 and P4 each supply a different laser element 34. Each of these has an adjustable gain factor G1, G2, G3 and G4. Thus, the power demand for each power supply can be individually adjusted.

Figure 4:
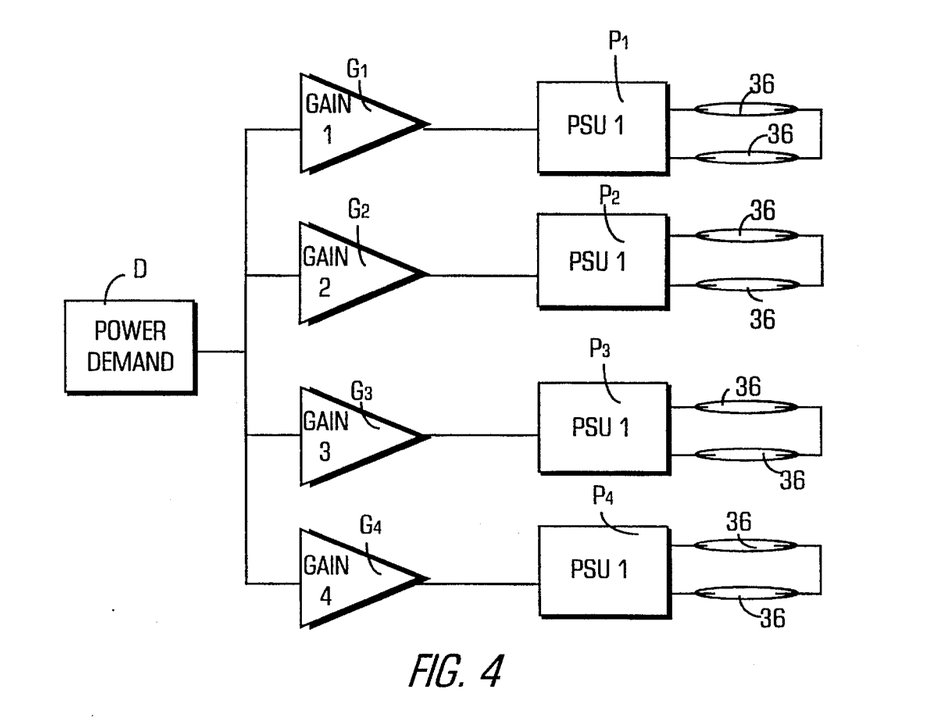
FIG. 4 shows schematically lamp power supply apparatus for the system.

As shown in FIG. 4, each pair of discharge lamps 36 is fed by a Power Supply Unit (PSU), $P_1$ to $P_4$ respectively. Power supply units for lasers are well known. The gain of each of these is individually adjustable by gain adjusters, $G_1$ to $G_4$ respectively. Gain adjusting apparatus is well known. These may be operational amplifiers for example. The total input power is supplied by power demand unit D. This may form part of a computer.

Figure 6:
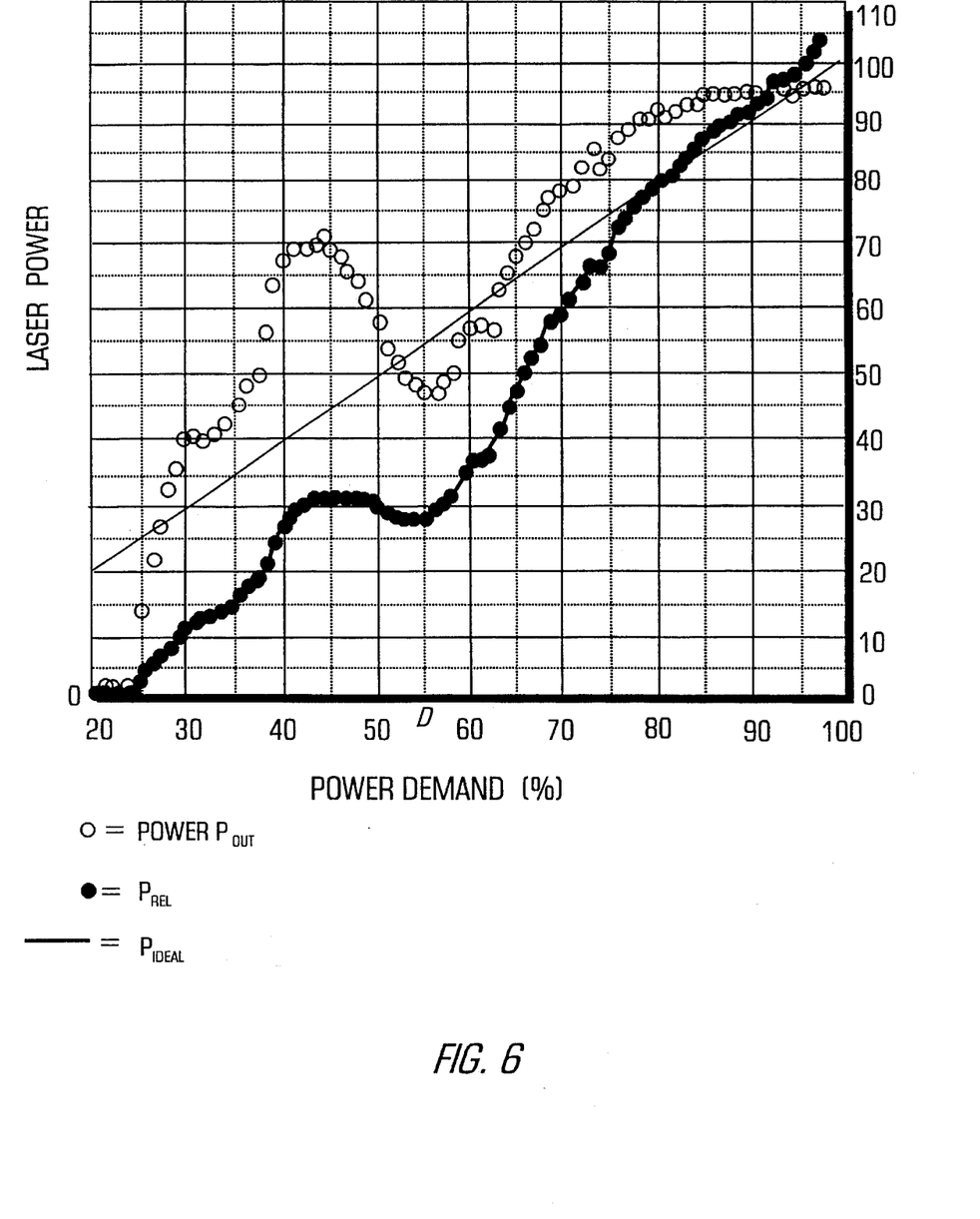
FIG. 6 shows a graph of laser output power against power demand for a poorly/imperfectly aligned and unbalanced laser system.

FIG. 6 shows a graph of output laser power against power demand. The power demand is a measure of the electrical input power (or 'pumping power') to the lamps. This is shown by the filled circles representing power $P_{out}$ in the figure. The performance of the resonator can be evaluated by a study of this parameter. However, it is found that better results are obtained using a criterion based on comparing the actual output power $P_{out}$ with an expected or "ideal" output power $P_{ideal}$. It is found that this "ideal" output power is given by $P_{ideal} = n.\epsilon.(P_{in} - P_{th})$ where:

n=number of rods $\epsilon$=slope efficiency $P_{in}$=pumping power per rod $P_{th}$=pumping power at threshold per rod In one example, $\epsilon$=5.6% and $P_{th}$=4.5 kw. A calculated graph of $P_{ideal}$ is shown as the straight line on FIG. 6 for the Lumonics MultiWave™ MW 2000 multi-rod laser, made by Lumonics Ltd, Cosford Lane, Swift Valley, Rugby, United Kingdom.

The relative resonator performance $P_{rel}$ can then be defined as $P_{rel} = P_{out}/P_{ideal}$ and this parameter is shown as the hollow circles on the figure. The use of parameter $P_{rel}$ is not essential but is desirable because, as shown in the figure, this parameter is more sensitive to instabilities as can be seen by the relative depth and sharpness of the dip shown around line D on the figure. $P_{rel}$ is also less sensitive to variations in $P_{in}$ and so allows some relaxation of the requirement to perform the balancing process precisely at an instability point. Thus the need to keep total input power constant during the balancing process is reduced.

In a preferred embodiment, gains $G_1$ to $G_4$ are adjustable between 70% and 100%, by 1% increments. A larger or smaller percentage variation, or incremental variation, is possible within the scope of the invention.

It is seen from FIG. 6 that there is a pronounced dip in the plots of parameters $P_{out}$ and $P_{rel}$. The lamp power value at the bottom of this dip, D, corresponds with an instability point of the resonator. The effect is also seen if the pumping power is continuously changed, i.e. ramped up or down. The laser power does not ramp up or down linearly but goes through the dip shown. When the laser is operated at this instability point the output power depends strongly on the alignment of the resonator and the balance between the focal lengths of the individual rods. If the balance is poor, the dip becomes deeper and wider, and if the balance improves, the dip becomes less deep and narrower. Perfect balance would make the dip disappear and would represent maximum output power.

The balancing procedure according to the present invention comprises measuring the output power at an instability point while changing the gains of each of the power supplies until an optimum combination of gain values is found, to give maximum output power. At its simplest this may be done by iteration, i.e. by optimising one gain at a time, one gain after another, and repeating this until no more improvement can be made, at which stage maximum output power should have been achieved.

Clearly, when altering the gains, it is important that the resonator stays at the instability point. That is, the total lamp power has to remain constant. Therefore, if gain $G_1$ is increased by one point for example, then gains $G_2$ to $G_4$ will be required to be reduced by ⅓ point each, keeping the total power input constant. If the total power input were not kept constant then, as a brief study of FIG. 6 will show, power output would increase with an increase (or decrease) in total power input, without improving stability.

Figure 5:
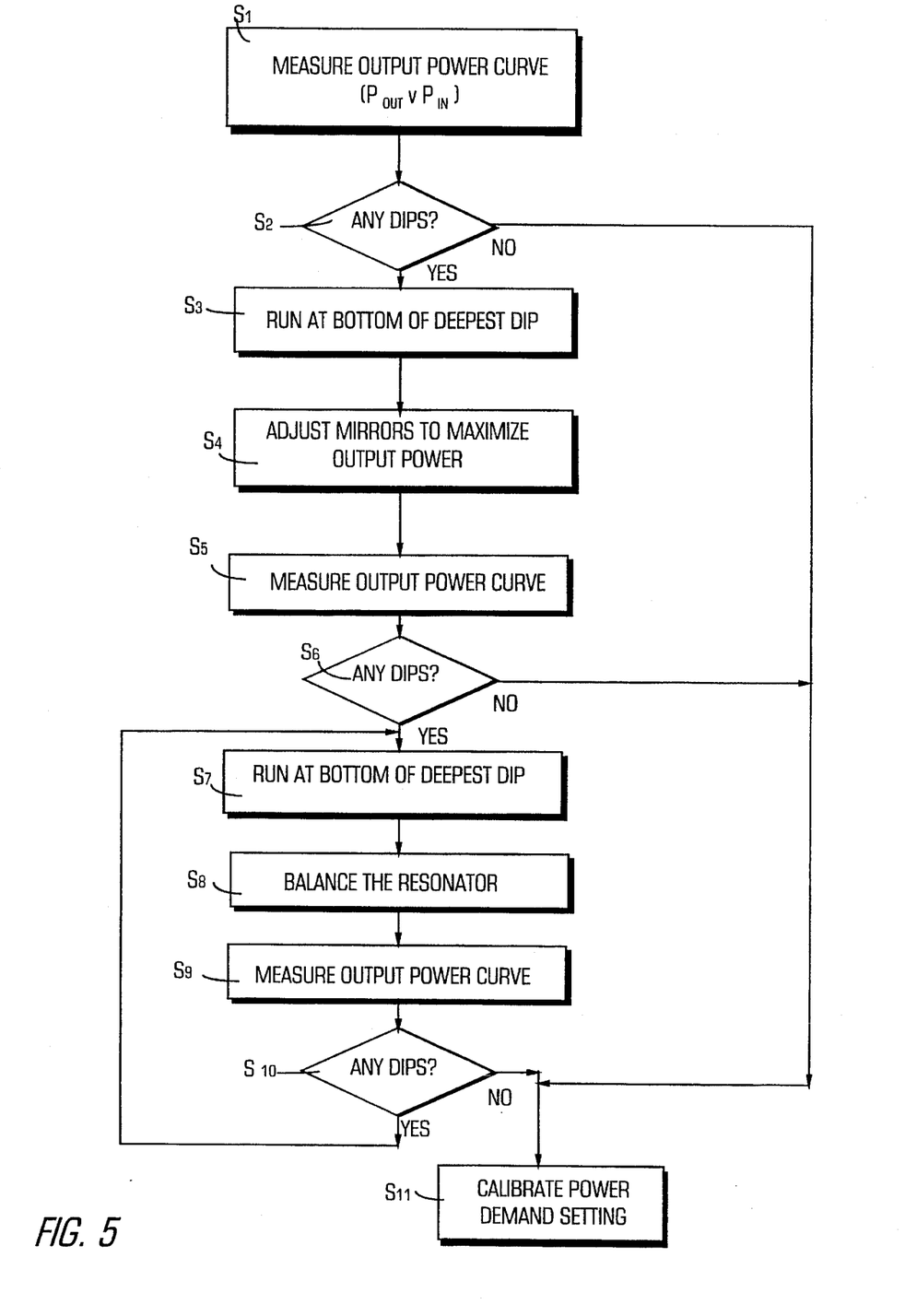
FIG. 5 is a flow diagram showing a method of balancing the laser elements.

One procedure for balancing and aligning the laser elements in a multi-element laser will now be described with reference to FIG. 5.

Referring to the Figure, the first step $S_1$ is to measure an initial power curve, $P_{out}$ v $P_{in}$, similar to that shown in FIG. 6. There are many standard ways of measuring the output power of a laser. Laser systems generally have a facility to read the power output directly. It may conveniently be done using the same computer as the computer 16 which controls the laser system, via a serial (RS 232) type interface. This may be a personal computer. Once the graph has been obtained, it is analysed (Step $S_2$) to see if any power dips (D) are present. This may be done visually by an operator, or automatically, by a software routine for example. The software may use, e.g., differentiating routines to determine changes of slope and peaks or troughs in the graph. If no dips are found then the system is assumed to be balanced and, if necessary the power demand setting is calibrated (step $S_{11}$) and the system is set for use.

If one or more dips are found, then the system is run at a power input corresponding to the bottom of the deepest dip (step $S_3$). This is because the resonator exhibits maximum alignment sensitivity at this point. The resonator mirrors 30, 32 can then be adjusted (in angle and/or spacing for example) to maximise the output power at this stage (Step $S_4$). A graph such as that shown in FIG. 7 may be obtained after this alignment, by again measuring the power curve, $P_{out}$ v $P_{in}$ (Step $S_5$).

Figure 7:
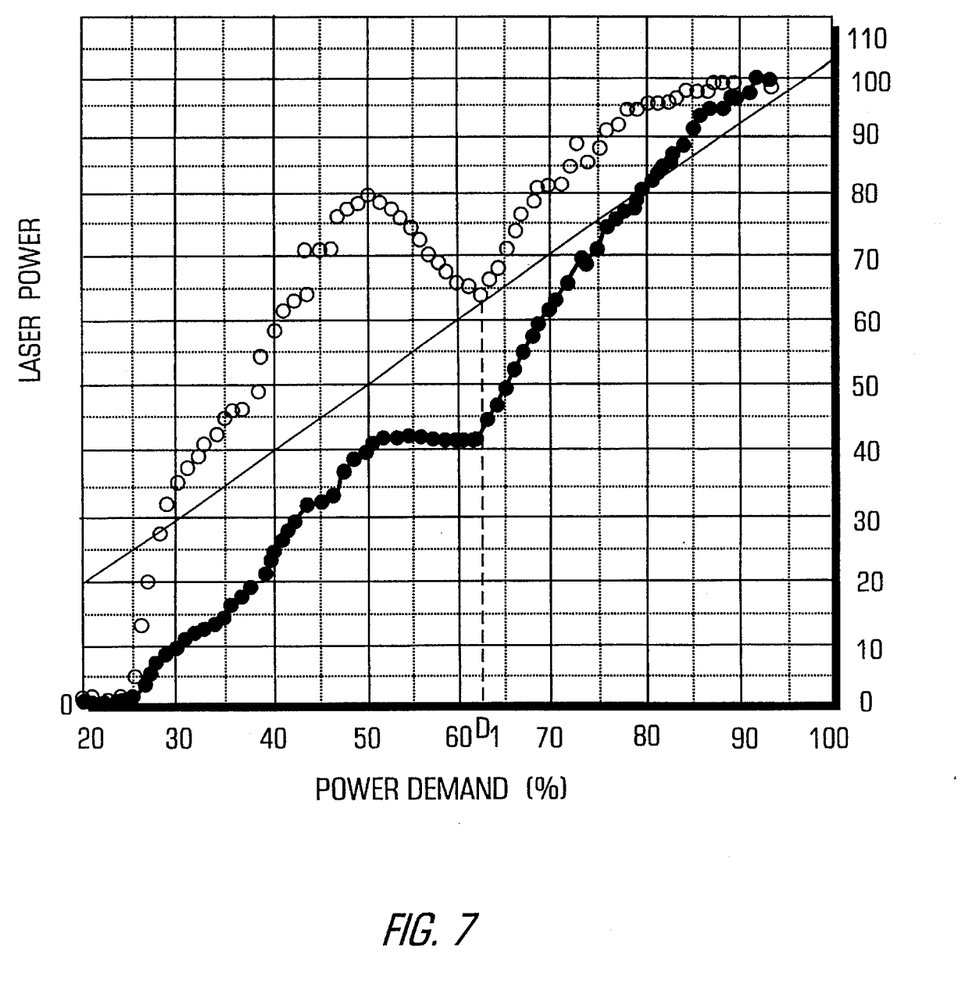
FIG. 7 shows a graph of output power against power demand after alignment.
Figure 8:
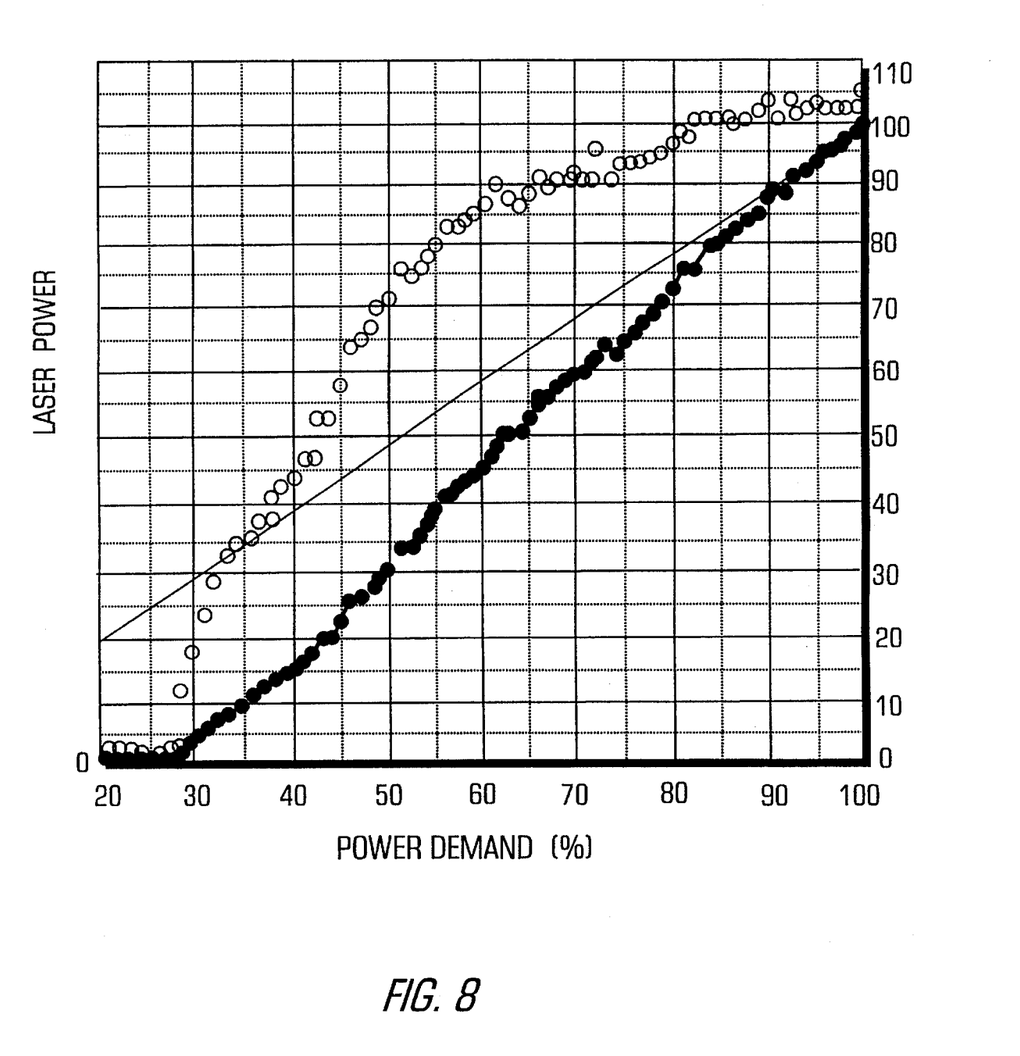
FIG. 8 shows a graph of output power against power demand after alignment and a balancing process.

The curve of FIG. 7 is then analysed to determine if it has any dips (Step $S_6$). If not, then optimum output has been achieved and the system may be calibrated if necessary and used. If yes, then the system is run at the bottom of the (new) deepest dip $D_1$ (Step $S_7$). The resonator may then be balanced, by a technique described below for example (Step $S_8$). A further power curve (FIG. 8) is obtained after balancing (Step $S_9$). The user then verifies (Step $S_{10}$) that there are no more dips ($S_{10}$) in the curve. This is true in the resultant curve shown in FIG. 8, which shows experimentally obtained results from a Lumonics MW 2000 laser. Comparison of FIG. 8 with FIGS. 6 and 7, which are for the same laser before, respectively, aligning and balancing, illustrate the improvements in output power available by utilising the present invention.

If any further dips were present, then it may be necessary to repeat the balancing process, or to select another dip to operate the laser system at during balancing for example. If no further dips are present, and the power output is optimised it is only necessary to calibrate the power demand setting (Step $S_{11}$), if necessary, before the laser is ready for use.

One balancing algorithm (i.e. Step $S_8$ in FIG. 5) is described below, by way of example.

Firstly, the four gains $G_1$ to $G_4$ are set to 90% so that they can be changed by ±10%. The performance of the system is then measured for $G_1$, $G_1-1\%$ and $G_1+1\%$. Gain $G_1$ is then set at whichever of these gives the most output performance. Thus, if $G_1$ (+0%) is found to give the best performance (ie most output), then $G_1$ is considered to be (temporarily) stable. This is then repeated mutatis mutandis for each of gains $G_2$ to $G_4$. During this process, if the average gain becomes higher than 91% or lower than 89% then the process is clearly drifting away from the instability point, in which case all the gains should be increased or decreased by 1%. If all the gains are now stable then the balancing process is completed and an optimum balance should have been achieved. If not, the process is repeated from the step of measuring $G_1$, $G_1+1\%$ and $G_1-1\%$. Note that all the percentages above are in absolute terms. (e.g. if $G_1= 90\%$, then $G_1+1\%=91\%$).

Finally, the four final gain values can be scaled up to a maximum of 100% if required.

It should be noted that each time a gain value is altered, the laser will require time to stabilise. For a Nd:YAG laser, this may take about 3 seconds (the thermal time constant for Nd:YAG). However, if the resonator is unstable the delay may be longer due to thermal runaway. In practice, a wait of around 5 seconds seems to be reasonable to conduct the process as speedily as possible yet with reasonable accuracy.

Changes in laser output power caused by changes in gain values will generally be quite small, usually of the same order as the adjustments in gain, probably to within 1%. Thus errors must be kept low. Noise can be a problem which should be allowed for, although calibration does not affect the process. The MW 2000 laser described above has an output power monitor. To reduce the effects of noise and improve accuracy, it is generally necessary to take a plurality of readings at each setting, and average them. Typically, an average (mean) over ten readings is taken.

Other balancing and/or alignment procedures may be used, within the spirit and scope of the invention, in substitution for the above.

The invention is also applicable to multi-element lasers other than solid-state lasers, e.g. $CO_2$ lasers. High power $CO_2$ lasers often include more than one discharge stage inside the resonator. Other laser types may also derive benefit from the invention.

Instead of output power being used as a feedback parameter, other parameters, such as beam quality, beam divergence, beam pointing and output power stability amongst others, may be optimised by the present invention.

Instead of input power being varied to control the thermal lensing of the laser elements, other means or parameters may be used, such as lamp current, lamp voltage, active optical elements inside the resonator, rod temperature and rod position amongst others.

Methods according to the present invention may be used to dynamically control other critical (i.e. non-periodic or unstable) resonator configurations. The output from oscillator-amplifier configurations may be optimised by the presently proposed methods, since a chain of amplifiers must be balanced to work effectively.

The positive feedback of the laser system may, instead of being provided by mirrors, alternatively be provided by other means, such as prisms, diffraction gratings and other means.

I claim:

1. A method of operating a laser resonator incorporating a plurality of active laser gain elements, each of which is excited by means of an individual power supply means having a respective amplifier of variable gain and provided with gain adjusting means, the laser resonator providing a laser beam at an output power in response to input power provided to the laser elements from the power supply means, wherein a plot of laser output power against input power forms an output curve for the laser resonator, which output curve exhibits instability points corresponding to dips in the output curve, each dip associated with a respective input power, said method comprising the steps of:

(a) measuring laser output power over a range of input power, (b) determining a point of laser resonator output instability and identifying the input power at which such point occurs; and (c) operating the laser resonator at said identified input power while selectively varying the gain of each of the amplifiers so as to maximize output power at said input power and substantially eliminate a dip in the output curve corresponding to said instability point.

2. A method of operating the laser resonator as claimed in claim 1, wherein the laser resonator further comprises resonator mirrors and a symmetric configuration such that the laser elements are equally spaced apart.

3. A method of operating the laser resonator as claimed in claim 1, wherein the laser elements are solid-state rods.

4. A method as claimed in claim 1, wherein step (c) includes iteratively varying the gain of each amplifier so that the gain of each amplifier is optimized while holding substantially constant the gain values set for each of the other amplifiers.

5. A method as claimed in claim 4, wherein the gain of each amplifier is iteratively varied using a computer.

6. A method as claimed in claim 1, wherein in step (b) the instability point is the point of greatest dip in the output curve.

7. A method as claimed in claim 1, wherein the resonator includes laser resonator mirrors and the method further comprises the step of adjusting alignment of one or both mirrors to maximize output power before execution of step (c).

8. A method as claimed in claim 7, wherein prior to performing step (a) the method comprises the steps of:

measuring a preliminary set of values of output power over a range of input power values;

selecting an instability point of the output curve and identifying the input power at which said instability point occurs; and operating the laser resonator at said identified input power while selectively adjusting the alignment of one or both of said mirrors to maximize output power at said input power.

9. A method as claimed in claim 8, further comprising:

identifying a deepest dip of the output curve as the instability point.

10. A method as claimed in claim 8, and including the further step of verifying that no instability points exist after execution of step (c).

11. A method as claimed in claim 8, and including the further step of calibrating power settings of the laser resonator after execution of step (c).

12. A method as claimed in claim 1, wherein the instability point is selected by identifying a dip in a plot of normalized output power against input power, and wherein the method comprises a further step between steps (a) and (b) of calculating said normalized output power values from values of output power measured in step (a).

13. A method of operating a laser resonator incorporating a plurality of pumping sections, each pumping section comprising energy providing means for providing pumping energy to an active laser gain element, the laser resonator providing an output beam having an output parameter, selected from the group consisting of output power, beam quality, beam divergence, beam pointing stability, and output power stability, which varies in response to a total input parameter which is based on an individual input parameter applied individually to each pumping section, the individually applied input parameter being selected from the group consisting of input power, control lamp current, and control lamp voltage, wherein a plot of said output parameter against said total input parameter forms an output curve for the laser resonator, which exhibits one or more instability points indicated as one or more dips in the output curve, each dip corresponding to a respective value of said total input parameter, said method comprising the steps of:

(a) measuring said output parameter over a range of said total input parameter, (b) selecting an instability point from said output curve and identifying the total input parameter at which such instability point occurs, and (c) operating the resonator at said identified total input parameter while selectively varying the individual input parameter applied to the individual pumping sections so as to maximize the output parameter to eliminate dips in the output curve.

14. A method as claimed in claim 13, further comprising:

providing active optical elements having variable properties within the resonator, the individual input parameter relating to one or more variable properties of said optical elements.

15. Laser apparatus, comprising:

a laser resonator incorporating a plurality of active laser gain elements, each of which is excited by means of an individual power supply means having a respective variable gain amplifier and provided with gain adjusting means, the laser resonator providing a laser beam at an output power in response to input power provided to the laser elements from the power supply means, wherein a plot of laser output power against input power forms an output curve for the laser resonator, which exhibits instability points corresponding go dips in the output curve, each dip associated with a respective input power; the laser apparatus having means for optimizing the output curve comprising:

power measurement means for measuring output power of the laser resonator over a range of input power;

selecting means for selecting an instability point in the output power of the laser resonator and identifying the input power at which such instability point occurs;

power control means for operating the laser resonator at said identified input power; and means for operating the gain adjusting means to vary the gain of the one or more amplifiers so as to maximize output power at said input power to substantially eliminate dips in the output curve.

16. Laser apparatus as claimed in claim 15, wherein the means for optimizing comprises a computer.

17. Laser apparatus as claimed in claim 15, comprising means for selectively altering the gains of the amplifiers iteratively by selectively optimizing the gain of each amplifier in turn while maintaining the gains of the other amplifiers substantially constant.

18. Laser apparatus as claimed in claim 15, said resonator further comprising two resonator mirrors, the resonator having a symmetric configuration such that the laser elements are equally spaced apart.

19. Laser apparatus as claimed in claim 18, wherein the means for optimizing comprises a computer.

20. Laser apparatus comprising:

a laser resonator incorporating a plurality of pumping sections, each pumping section including energy providing means for providing pumping energy to an active laser gain element, the laser resonator providing a laser beam having an output parameter, selected from the group consisting of output power, beam quality, beam divergence, beam pointing stability, and output power stability, which varies in response to a total input parameter, the total input parameter being based on an individual input parameter individually applied to each pumping section, selected from the group consisting of input power, control lamp current, and control lamp voltage, wherein a plot of said output parameter against said total input parameter exhibits an output curve which exhibits one or more instability points indicated as one or more dips in the output curve, each dip associated with a respective total input parameter; wherein the laser apparatus further comprises means for optimizing the performance of the laser resonator comprising:

output parameter measurement means for measuring said output parameter over a range of said total input parameter;

selecting means for selecting an instability point and identifying the value of the total input parameter at which said instability point occurs;

power control means for operating the laser resonator at said identified total input parameter; and means for selectively varying the individual input parameters to each pumping section so as to maximize the output parameter to substantially eliminate one or more dips in the output curve.

21. Laser apparatus as claimed in claim 20, wherein the resonator includes a plurality of active optical elements having variable properties and the total input parameter relates to one or more variable properties of said optical elements.

* * * * *